US010266129B2

(12) United States Patent
Ito et al.

(10) Patent No.: US 10,266,129 B2
(45) Date of Patent: Apr. 23, 2019

(54) VEHICLE CONTROL SYSTEM

(71) Applicant: JTEKT CORPORATION, Osaka-shi, Osaka (JP)

(72) Inventors: Takehiro Ito, Kuwana-gun (JP); Satoru Mikamo, Okazaki (JP); Yuji Fujita, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/943,829

(22) Filed: Apr. 3, 2018

(65) Prior Publication Data

US 2018/0290605 A1 Oct. 11, 2018

(30) Foreign Application Priority Data

Apr. 10, 2017 (JP) ................. 2017-077434

(51) Int. Cl.
| | |
|---|---|
| *H02P 6/06* | (2006.01) |
| *B60R 16/02* | (2006.01) |
| *G06F 11/30* | (2006.01) |
| *B60L 11/18* | (2006.01) |
| *B60L 15/00* | (2006.01) |

(Continued)

(52) U.S. Cl.
CPC .......... *B60R 16/02* (2013.01); *B60L 11/1803* (2013.01); *B60L 15/007* (2013.01); *B60L 15/02* (2013.01); *G06F 11/3055* (2013.01); *H02P 27/00* (2013.01); *B60L 2240/527* (2013.01); *B60L 2260/40* (2013.01); *H02M 2001/325* (2013.01); *H02P 27/04* (2013.01); *Y02T 10/644* (2013.01); *Y02T 10/645* (2013.01); *Y02T 10/7005* (2013.01)

(58) Field of Classification Search
CPC ....... B60R 16/02; B60L 11/1803; B60L 11/18
USPC ..................................... 318/400.03
See application file for complete search history.

(56) References Cited

U.S. PATENT DOCUMENTS

| | | | | |
|---|---|---|---|---|
| 2002/0177932 | A1* | 11/2002 | Kifuku ................ | B62D 5/0463 701/41 |
| 2017/0237377 | A1* | 8/2017 | Furukawa ............ | B62D 5/0463 318/564 |
| 2017/0346419 | A1* | 11/2017 | Bogus ................ | G06F 13/4022 |

FOREIGN PATENT DOCUMENTS

| | | |
|---|---|---|
| EP | 2275322 A2 | 1/2011 |
| EP | 2897285 A2 | 7/2015 |

(Continued)

OTHER PUBLICATIONS

Aug. 13, 2018 extended European Search Report issued in European Patent Application No. 18166104.2.

*Primary Examiner* — Erick D Glass
(74) *Attorney, Agent, or Firm* — Oliff PLC (57) ABSTRACT

Provided is a vehicle control system that appropriately performs synchronization control for a plurality of control systems. A monitoring circuit generates a command signal when only a first reset signal is input. The monitoring circuit generates a command signal when the state in which only the first reset signal is input is changed to the state in which the input of the first reset signal is stopped. With the command signal, a second clock signal is output to a timer generator as a second timing signal. With the command signal, the second clock signal generated by a second synchronization signal generating circuit is output to a first synchronization signal generating circuit, and a third clock signal generated by the first synchronization signal generating circuit is output to a timer generator as a first timing signal.

4 Claims, 3 Drawing Sheets

(51) Int. Cl.
  *B60L 15/02* (2006.01)
  *H02P 27/00* (2006.01)
  *H02P 27/04* (2016.01)
  *H02M 1/32* (2007.01)

(56) References Cited

FOREIGN PATENT DOCUMENTS

| | | |
|---|---|---|
| JP | 2005-102394 A | 4/2005 |
| JP | 2007-267510 A | 10/2007 |
| WO | 2010061918 A1 | 6/2010 |

\* cited by examiner

VEHICLE CONTROL SYSTEM

INCORPORATION BY REFERENCE

The disclosure of Japanese Patent Application No. 2017-077434 filed on Apr. 10, 2017 including the specification, drawings and abstract, is incorporated herein by reference in its entirety.

BACKGROUND OF THE INVENTION

1. Field of the Invention

The present invention relates to a vehicle control system.

2. Description of the Related Art

For example, a vehicle control system described in International Publication No. 2010/061918 (WO 2010/061918) is known as a vehicle control system configured to control an operation of a control target by a plurality of control systems. WO 2010/061918 discloses a motor control system including two control systems (computation controllers and drive circuits) configured to supply driving electric power to a motor that is the control target. In the motor control system, in order that the two control systems can supply the driving electric power to the motor in synchronization with each other, the computation controller of the first control system includes a synchronization signal transmitting circuit configured to transmit a synchronization signal serving as a reference to synchronization between the two control systems, and the computation controller of the second control system includes a synchronization signal receiving circuit configured to receive the synchronization signal transmitted from the synchronization signal transmitting circuit. The synchronization signal transmitting circuit of the first control system transmits the synchronization signal to the synchronization signal receiving circuit of the second control system every time a pulse generated by a clock (hereinafter referred to as "clock pulse") is detected a predetermined number of times. When the synchronization signal receiving circuit of the second control system receives the synchronization signal, a control operation of the second control system is synchronized with a processing timing of a control operation of the first control system.

In the motor control system described above, for example, each control system is supplied with electric power by being connected to a power supply configured to convert electric power from an on-board battery into a voltage value suitable for the control system. There is a case where the synchronization signal is not transmitted to the second control system because the voltage value of the power supply connected to the first control system is lower than a voltage value necessary for the first control system to operate and therefore only the operation of the first control system is stopped. In order that the motor control system may continuously control the motor to meet a demand for improvement in the safety of the motor control system, only the second control system may control the motor by determining a processing timing of the control operation of the second control system based on a clock pulse of the second control system. While the second control system is controlling the motor at the processing timing of the control operation that is determined based on the clock pulse of the second control system, the voltage value of the power supply connected to the first control system may recover its normal value and the control operation of the first control system may operate again. Since the first control system operates, the synchronization signal transmitting circuit transmits the synchronization signal toward the second control system.

Due to the state in which the second control system determines the processing timing based on the clock pulse of the second control system, the processing timing of the control operation of the second control system may deviate when the synchronization signal is input from the first control system. Furthermore, pulsation of a torque of the motor may occur to cause a driver's feeling of discomfort.

SUMMARY OF THE INVENTION

It is one object of the present invention to provide a vehicle control system that appropriately performs synchronization control for a plurality of control systems when an operation status of a control system configured to output a synchronization signal serving as a reference to synchronization between the control systems is changed from a stopped state to an operating state.

A vehicle control system according to one aspect of the present invention includes:

a plurality of control circuits configured to control an operation of a control target in cooperation with each other; and at least one monitoring circuit configured to detect operation statuses of the control circuits.

Each of the control circuits is configured to generate a synchronization signal for synchronizing operations of the control circuits. Control operations of the control circuits are synchronized based on the synchronization signal generated by a first control circuit out of the control circuits.

When the monitoring circuit detects that the operation status of the first control circuit is changed from a stopped state to an operating state while a remaining control circuit except the first control circuit continues to perform the control operation, the monitoring circuit is configured to synchronize the control operation of the first control circuit with the control operation of the remaining control circuit that is operating continuously based on the synchronization signal generated by the remaining control circuit that is operating continuously.

When the operation status of the first control circuit is brought into the stopped state, the remaining control circuit except the first control circuit out of the control circuits may continuously control the operation of the control target. However, the timing of the control operation of the remaining control circuit may deviate when the operation status of the first control circuit is changed from the stopped state to the operating state while the remaining control circuit is operating.

In this respect, with the configuration described above, when the operation status of the first control circuit is changed from the stopped state to the operating state while the remaining control circuit is operating continuously, the control operation of the first control circuit is synchronized with the control operation of the remaining control circuit based on the synchronization signal of the remaining control circuit. Thus, it is possible to appropriately perform the synchronization control for the control circuits when the operation status of the first control circuit is changed from the stopped state to the operating state while the remaining control circuit is operating.

BRIEF DESCRIPTION OF THE DRAWINGS

The foregoing and further features and advantages of the invention will become apparent from the following descrip

DETAILED DESCRIPTION OF EMBODIMENTS

Figure 1:
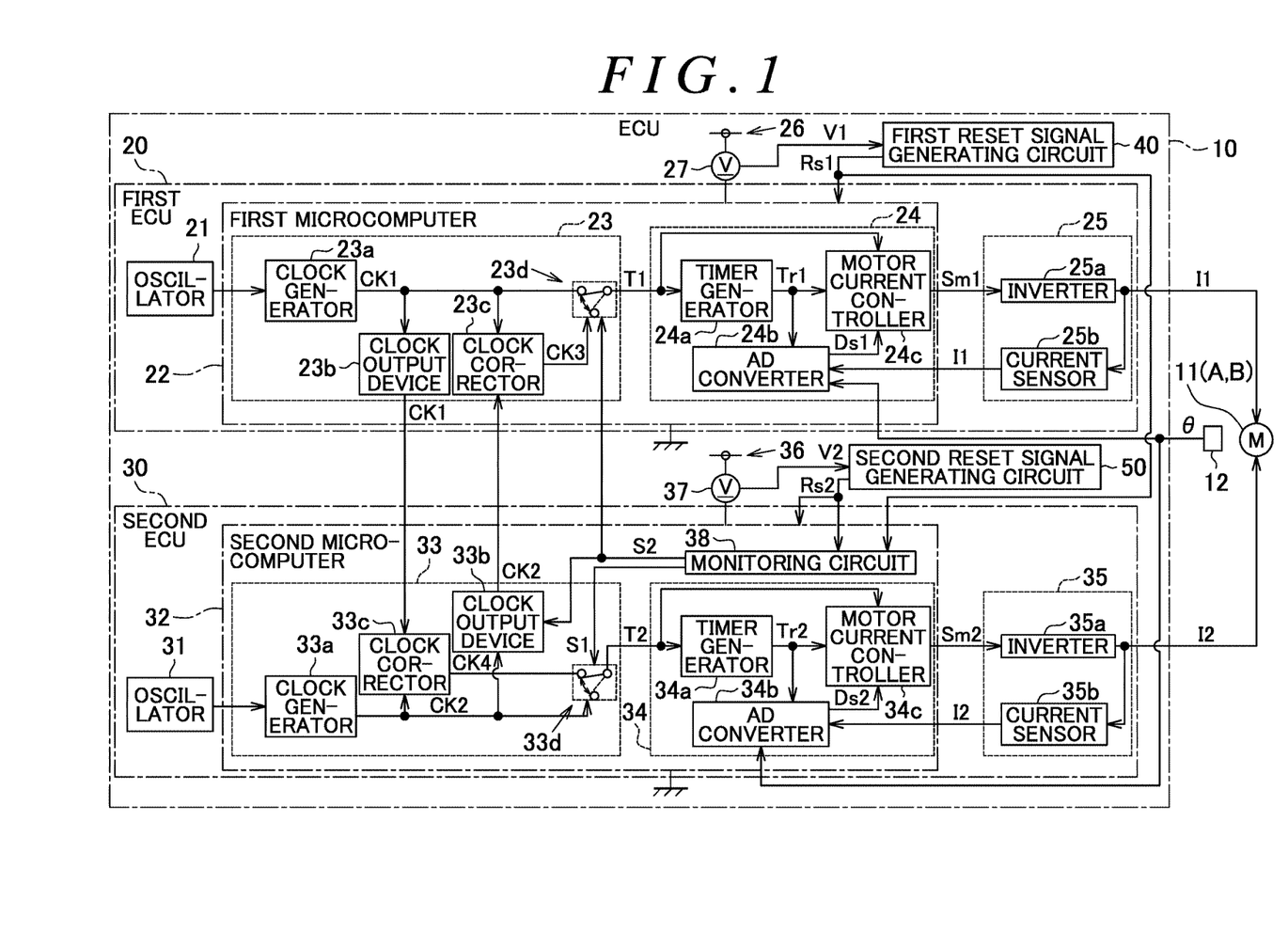
- FIG. 1 is a functional block diagram illustrating a vehicle control system according to a first embodiment.

A vehicle control system according to a first embodiment of the present invention is described below. As illustrated in FIG. 1, the vehicle control system of this embodiment is a motor control system (hereinafter referred to as "ECU") configured to control an operation of a motor 11 that is a control target. An ECU 10 controls driving of the motor 11 to apply a motor torque to, for example, a steering mechanism of a vehicle, thereby executing power steering control for assisting a driver's steering operation.

A three-phase brushless motor is employed as the motor 11. The motor 11 includes motor coil groups for two systems each having three phases (U phase, V phase, and W phase). That is, the motor 11 includes a motor coil group A and a motor coil group B for two systems, which are electrically independent of each other. The motor coil group A and the motor coil group B have similar configurations. The motor 11 further includes a rotation angle sensor 12 configured to detect a rotation angle θ as a condition amount indicating an operation condition (rotation condition) of the motor 11.

The ECU 10 includes a first ECU 20 serving as a first control circuit, a second ECU 30 serving as a remaining control circuit, a first reset signal generating circuit 40, and a second reset signal generating circuit 50. The first ECU 20 controls electric power supply to the motor coil group A. The first ECU 20 is connected to a first power supply 26 configured to convert electric power from an on-board battery provided on the outside into a voltage value suitable for the first ECU 20. The first ECU 20 operates by being supplied with the electric power from the first power supply 26. A voltage sensor 27 is provided between the first ECU 20 and the first power supply 26. The voltage sensor 27 detects a voltage value V1 of the first power supply 26. The second ECU 30 controls electric power supply to the motor coil group B. The second ECU 30 is connected to a second power supply 36 configured to convert electric power from the on-board battery provided on the outside into a voltage value suitable for the second ECU 30. The second ECU 30 operates by being supplied with the electric power from the second power supply 36. A voltage sensor 37 is provided between the second ECU 30 and the second power supply 36. The voltage sensor 37 detects a voltage value V2 of the second power supply 36. The first reset signal generating circuit 40 monitors the voltage value V1 detected by the voltage sensor 27. The first reset signal generating circuit 40 generates a first reset signal Rs1 for keeping a control operation of the first ECU 20 in a stopped state until the voltage value V1 is stabilized. The second reset signal generating circuit 50 monitors the voltage value V2 detected by the voltage sensor 37. The second reset signal generating circuit 50 generates a second reset signal Rs2 for keeping a control operation of the second ECU 30 in a stopped state until the voltage value V2 is stabilized. The phrase "the voltage values V1 and V2 are stabilized" means that the voltage values V1 and V2 of the first power supply 26 and the second power supply 36 are constantly kept within a predetermined range in which the first ECU 20 and the second ECU 30 can be operated normally. The first reset signal generating circuit 40 and the second reset signal generating circuit 50 have the same configuration.

In the ECU 10, the first ECU 20 and the second ECU 30 communicate with each other to synchronize their control operations. The ECU 10 includes the first ECU 20 and the second ECU 30 to achieve redundancy for the control system relating to the driving of the motor 11. For example, when the first ECU 20 has such an abnormality that the first ECU 20 cannot continue to control the electric power supply to the motor 11, the control performed by the first ECU 20 on the electric power supply to the motor 11 is stopped, and the electric power supply to the motor 11 is controlled only by the second ECU 30. When the second ECU 30 has such an abnormality that the second ECU 30 cannot continue to control the electric power supply to the motor 11, the control performed by the second ECU 30 on the electric power supply to the motor 11 is stopped, and the electric power supply to the motor 11 is controlled only by the first ECU 20.

Next, the configurations of the first ECU 20 and the second ECU 30 are described. The first ECU 20 and the second ECU 30 have similar configurations. The first ECU 20 includes an oscillator 21, a first microcomputer 22, and a first drive circuit 25.

The oscillator 21 is formed of a crystal element or the like. The oscillator 21 generates a clock (triangular wave) of a fundamental frequency for determining a timing of a control operation of the first microcomputer 22.

The first drive circuit 25 includes an inverter 25a and a current sensor 25b. The inverter 25a includes a plurality of switching elements such as FETs corresponding to the three phases (U phase, V phase, and W phase). The inverter 25a is provided such that three sets of switching arms each having two FETs connected in series are formed by being connected in parallel between a positive terminal and a negative terminal of the on-board battery. The current sensor 25b detects a current value I1 of each phase in an electric power supply path between the inverter 25a and the motor coil group A of the motor 11.

The first microcomputer 22 generates a control signal Sm1 for operating the motor 11 based on the clock generated by the oscillator 21, the current value I1 detected by the current sensor 25b, and the rotation angle θ detected by the rotation angle sensor 12 of the motor 11. The first microcomputer 22 is connected to the first power supply 26.

Next, the configuration of the first microcomputer 22 is described in detail. The first microcomputer 22 includes a first synchronization signal generating circuit 23 and a first computation circuit 24. The first synchronization signal generating circuit 23 generates a first clock signal CK1 (triangular wave) serving as a synchronization signal, and a first timing signal T1 (triangular wave). The first clock signal CK1 is generated based on the clock generated by the oscillator 21. The first timing signal T1 is used for adjusting a timing of a control operation of the first computation circuit 24. When the first ECU 20 operates normally, the first synchronization signal generating circuit 23 outputs the first clock signal CK1 to the second ECU 30.

The first synchronization signal generating circuit 23 includes a clock generator 23a, a clock output device 23b, a clock corrector 23c, and a switching device 23d. The clock generator 23a is a multiplier, and generates the first clock signal CK1 by multiplying the clock generated by the oscillator 21 by a predetermined multiple. The clock output device 23b outputs the first clock signal CK1 generated by the clock generator 23a to the second ECU 30.

The clock corrector 23c generates a third clock signal CK3 in consideration of the first clock signal CK1 generated by the clock generator 23a and a second clock signal CK2 described later, which serves as a synchronization signal and is output from the second ECU 30.

The switching device 23d is provided from the viewpoint of outputting the first clock signal CK1 generated by the clock generator 23a or the third clock signal CK3 generated by the clock corrector 23c to a timer generator 24a as the first timing signal T1. When the first microcomputer 22 operates normally, the switching device 23d outputs the first clock signal CK1 to the timer generator 24a as the first timing signal T1. When a command signal S2 generated by a monitoring circuit 38 described later is input to the switching device 23d, the switching device 23d switches a switch to output the third clock signal CK3 generated by the clock corrector 23c to the timer generator 24a as the first timing signal T1.

The first computation circuit 24 generates the control signal Sm1 based on the rotation angle θ detected by the rotation angle sensor 12 and the current value I1 detected by the current sensor 25b. The first computation circuit 24 determines a timing to generate the control signal Sm1 based on the first timing signal T1.

The first computation circuit 24 includes the timer generator 24a, an AD converter 24b, and a motor current controller 24c. The timer generator 24a includes a publicly-known frequency divider and a publicly-known up/down counter. The timer generator 24a causes the up/down counter to count up or down the first timing signal T1 whose frequency is divided by the frequency divider. When the first timing signal T1 reaches a predetermined count value, the timer generator 24a outputs an operation trigger Tr1 to the AD converter 24b and the motor current controller 24c.

The AD converter 24b converts an analog signal of the current value I1 detected by the current sensor 25b and the rotation angle θ detected by the rotation angle sensor 12 into a digital signal Ds1 (AD conversion) based on the operation trigger Tr1. The AD converter 24b outputs the digital signal Ds1 to the motor current controller 24c.

The motor current controller 24c computes a command value for operating the motor coil group A of the motor 11 from the digital signal Ds1 of the current value I1 and the rotation angle θ based on the operation trigger Tr1. The motor current controller 24c generates the control signal Sm1 (PWM signal) based on the command value.

The operation trigger Tr1 defines a computation timing in the motor current controller 24c, and an AD conversion timing in the AD converter 24b. Both timings are synchronized.

The second ECU 30 includes an oscillator 31, a second microcomputer 32, and a second drive circuit 35. The oscillator 31 is formed of a crystal element or the like. The oscillator 31 generates a clock (triangular wave) of a fundamental frequency for determining a timing of a control operation of the second microcomputer 32.

The second drive circuit 35 includes an inverter 35a and a current sensor 35b. The inverter 35a includes a plurality of switching elements such as FETs corresponding to the three phases (U phase, V phase, and W phase). The inverter 35a is provided such that three sets of switching arms each having two FETs connected in series are formed by being connected in parallel between the positive terminal and the negative terminal of the on-board battery. The current sensor 35b detects a current value I2 of each phase in an electric power supply path between the inverter 35a and the motor coil group B.

The second microcomputer 32 generates a control signal Sm2 for driving the motor 11 based on the clock generated by the oscillator 31, the current value I2 detected by the current sensor 35b, and the rotation angle θ detected by the rotation angle sensor 12 of the motor 11. The second microcomputer 32 is connected to the second power supply 36.

Next, the configuration of the second microcomputer 32 is described in detail. The second microcomputer 32 includes a second synchronization signal generating circuit 33, a second computation circuit 34, and the monitoring circuit 38.

The second synchronization signal generating circuit 33 generates the second clock signal CK2 (triangular wave) serving as a synchronization signal, and a second timing signal T2 (triangular wave). The second clock signal CK2 is generated based on the clock generated by the oscillator 31. The second timing signal T2 is used for adjusting a timing of a control operation of the second computation circuit 34. When the first microcomputer 22 operates normally, the second synchronization signal generating circuit 33 does not output the second clock signal CK2 to the first synchronization signal generating circuit 23. That is, when the first microcomputer 22 operates normally, the control operation of the second microcomputer 32 is synchronized with the control operation of the first ECU 20 based on the first clock signal CK1 generated by the first synchronization signal generating circuit 23 of the first microcomputer 22. Therefore, the second synchronization signal generating circuit 33 of the second microcomputer 32 generates the second timing signal T2 in consideration of the first clock signal CK1 generated by the first synchronization signal generating circuit 23 and the second clock signal CK2 generated by the second synchronization signal generating circuit 33.

The second synchronization signal generating circuit 33 includes a clock generator 33a, a clock output device 33b, a clock corrector 33c, and a switching device 33d. When the first microcomputer 22 operates normally, the clock output device 33b of the second synchronization signal generating circuit 33 does not output the second clock signal CK2 generated by the clock generator 33a to the clock corrector 23c of the first synchronization signal generating circuit 23. When the command signal S2 generated by the monitoring circuit 38 described later is input to the clock output device 33b, the clock output device 33b outputs the second clock signal CK2 generated by the clock generator 33a to the clock corrector 23c of the first synchronization signal generating circuit 23.

The clock corrector 33c generates a fourth clock signal CK4 in consideration of the second clock signal CK2 generated by the clock generator 33a and the first clock signal CK1 output from the clock output device 23b of the first synchronization signal generating circuit 23.

The generation of the third clock signal CK3 and the fourth clock signal CK4 is described in detail. Oscillating elements (for example, crystal elements) of the oscillators 21 and 31 have a small individual difference. The individual difference causes variations in the clocks of the fundamental frequencies that are output from the oscillators 21 and 31. Furthermore, a deviation may occur between the first clock signal CK1 and the second clock signal CK2 that are generated by the clock generators 23a and 33a to which the clocks are input from the oscillators 21 and 31. The clock deviation caused by the oscillators 21 and 31 is not eliminated, but may affect the count values of the timer generators 24a and 34a to finally cause a temporal deviation between the timings of the control operations of the first ECU 20 and the second ECU 30. Therefore, the clock corrector 23c performs correction so that the first clock signal CK1 coincides with the second clock signal CK2, thereby generating the third clock signal CK3 in which the temporal deviation between the first clock signal CK1 and the second clock signal CK2 is suppressed. The clock corrector 33c performs correction so that the second clock signal CK2 coincides with the first clock signal CK1, thereby generating the fourth clock signal CK4 in which the temporal deviation between the first clock signal CK1 and the second clock signal CK2 is suppressed.

The switching device 33d is provided from the viewpoint of outputting the second clock signal CK2 generated by the clock generator 33a or the fourth clock signal CK4 generated by the clock corrector 33c to the timer generator 34a as the second timing signal T2. When the first microcomputer 22 operates normally, the switching device 33d outputs the fourth clock signal CK4 to the timer generator 34a as the second timing signal T2. When a command signal S1 generated by the monitoring circuit 38 described later is input to the switching device 33d, the switching device 33d switches a switch to output the second clock signal CK2 generated by the clock generator 33a to the timer generator 34a as the second timing signal T2.

The second computation circuit 34 includes the timer generator 34a, an AD converter 34b, and a motor current controller 34c. The timer generator 34a causes an up/down counter to count up or down the second timing signal T2 whose frequency is divided by a frequency divider. When the second timing signal T2 reaches a predetermined count value, the timer generator 34a outputs an operation trigger Tr2 to the AD converter 34b and the motor current controller 34c.

The AD converter 34b converts an analog signal of the current value 12 detected by the current sensor 35b and the rotation angle θ detected by the rotation angle sensor 12 into a digital signal Ds2 (AD conversion) based on the operation trigger Tr2. The AD converter 34b then outputs the digital signal Ds2 to the motor current controller 34c.

The motor current controller 34c computes a command value for operating the motor coil group B of the motor 11 from the digital signal Ds2 of the current value 12 and the rotation angle θ based on the operation trigger Tr2. The motor current controller 34c generates the control signal Sm2 (PWM signal) based on the command value.

The monitoring circuit 38 monitors the first reset signal Rs1 generated by the first reset signal generating circuit 40 and the second reset signal Rs2 generated by the second reset signal generating circuit 50.

Figure 2:
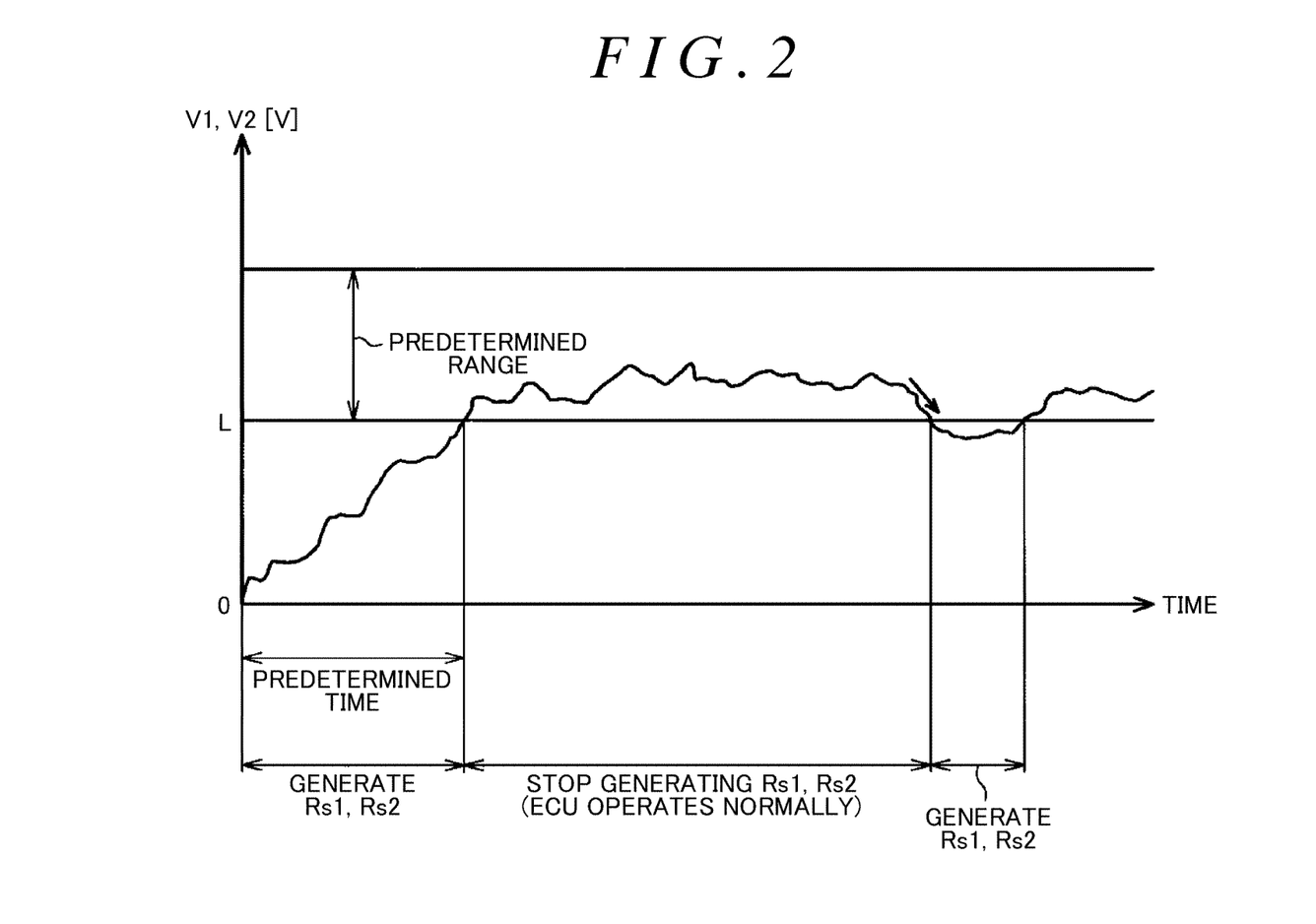
FIG. 2 is a graph illustrating changes in voltage values of a first power supply and a second power supply of the vehicle control system.

A technical significance of the first reset signal Rs1 and the second reset signal Rs2 is described. As illustrated in FIG. 2, when electric power starts to be supplied from the first power supply 26 and the second power supply 36 to the first ECU 20 and the second ECU 30, the voltage values V1 and V2 are gradually increased. After an elapse of a predetermined time from the time when the electric power starts to be supplied from the first power supply 26 and the second power supply 36 to the first ECU 20 and the second ECU 30, the voltage values V1 and V2 are constantly kept within a predetermined range in which the first ECU 20 and the second ECU 30 can be operated normally. It is assumed that the first ECU 20 and the second ECU 30 are operated in a state in which the voltage values V1 and V2 of the first ECU 20 and the second ECU 30 are values in the vicinity of a threshold L that is a minimum value at which the first ECU 20 and the second ECU 30 can be operated. In this case, for some reasons, the voltage values V1 and V2 of the first power supply 26 and the second power supply 36 may be lower than the threshold L that is a minimum value at which the first ECU 20 and the second ECU 30 can be operated. Along with this phenomenon, the control operations of the first ECU 20 and the second ECU 30 are stopped and, accordingly, the control operation of the ECU 10 may be unstable.

Therefore, the first reset signal Rs1 and the second reset signal Rs2 are set from the viewpoint of keeping the control operations of the first ECU 20 and the second ECU 30 in a stopped state until the voltage values V1 and V2 of the first power supply 26 and the second power supply 36 are constantly kept within the predetermined range in which the first ECU 20 and the second ECU 30 can be operated normally. When the first reset signal generating circuit 40 and the second reset signal generating circuit 50 determine that the voltage values V1 and V2 are constantly kept within the predetermined range in which the first ECU 20 and the second ECU 30 can be operated normally, the first reset signal generating circuit 40 and the second reset signal generating circuit 50 stop generating the first reset signal Rs1 and the second reset signal Rs2, thereby starting the control operations of the first ECU 20 and the second ECU 30. The threshold L is set as a lower limit value of the predetermined range in which the first ECU 20 and the second ECU 30 can be operated normally.

As illustrated in FIG. 1, the monitoring circuit 38 generates the command signals S1 and S2 in accordance with input statuses of the first reset signal Rs1 and the second reset signal Rs2. The command signals S1 and S2 are set from the viewpoint of synchronizing the control operation of the first ECU 20 with the control operation of the second ECU 30 based on the second clock signal CK2 generated by the second ECU 30 (second microcomputer 32). Specifically, the command signal S1 is a signal for selecting the second clock signal CK2 generated by the second synchronization signal generating circuit 33 as the second timing signal T2. The command signal S2 is a signal for outputting the second clock signal CK2 from the second synchronization signal generating circuit 33 to the first synchronization signal generating circuit 23. Further, the command signal S2 is a signal for outputting the third clock signal CK3 generated by the first synchronization signal generating circuit 23 to the timer generator 24a as the first timing signal T1.

A relationship between the input statuses of the first reset signal Rs1 and the second reset signal Rs2 and the command signals S1 and S2 is described in detail. When the ECU 10 operates normally, the first reset signal Rs1 and the second reset signal Rs2 are not input to the monitoring circuit 38.

First, it is assumed that the state in which the first reset signal Rs1 and the second reset signal Rs2 are not input to the monitoring circuit 38 is changed to the state in which the control operation of the second microcomputer 32 is brought into a stopped state and then returns to an operating state. In this case, the monitoring circuit 38 does not generate the command signals S1 and S2. That is, when the state in which the second reset signal Rs2 is input to the monitoring circuit 38 is changed to the state in which the input of the second reset signal Rs2 is stopped, the monitoring circuit 38 does not generate the command signals S1 and S2. Description is given below of the reason why the command signals S1 and S2 are not generated when the control operation of the second microcomputer 32 returns from the stopped state to the operating state.

<Reason why Command Signals S1 and S2 are not Generated>

As illustrated in FIG. 2, when the ECU 10 operates normally, the control operations of the first microcomputer 22 and the second microcomputer 32 are synchronized based on the first clock signal CK1 generated by the first microcomputer 22. For some reasons, the voltage values V1 and V2 of the first power supply 26 and the second power supply 36 may be changed (in the descending arrow direction in FIG. 2) to the vicinity of the threshold L that is a minimum value at which the first ECU 20 and the second ECU 30 can be operated. Along with the change in the voltage values V1 and V2, the first reset signal generating circuit 40 may determine that the voltage value V1 of the first power supply 26 is constantly kept within the predetermined range in which the first microcomputer 22 can be operated normally, and the second reset signal generating circuit 50 may determine that the voltage value V2 of the second power supply 36 is not constantly kept within the predetermined range in which the second microcomputer 32 can be operated normally. In this case, the first reset signal generating circuit 40 does not generate the first reset signal Rs1, and only the second reset signal generating circuit 50 generates the second reset signal Rs2. That is, the control operation of the second ECU 30 may be brought into the stopped state.

The reason may be as follows. The first reset signal generating circuit 40 and the second reset signal generating circuit 50 have the same configuration, but have variations in their hardware or the like. That is, even if the voltage values V1 and V2 are changed but are constantly kept within the predetermined range in which the first ECU 20 and the second ECU 30 can be operated normally, only the second reset signal generating circuit 50 determines that the voltage value V2 is not constantly kept within the predetermined range in which the second ECU 30 can be operated normally, and only the second reset signal generating circuit 50 generates the second reset signal Rs2 because the thresholds L set in the first reset signal generating circuit 40 and the second reset signal generating circuit 50 have a slight variation.

In this case, as illustrated in FIG. 1, the control operation of the second microcomputer 32 is stopped by the second reset signal Rs2, and the first microcomputer 22 performs the control operation based on the first clock signal CK1 generated by the first microcomputer 22. The second reset signal generating circuit 50 then determines that the voltage value V2 is constantly kept again within the predetermined range in which the second microcomputer 32 can be operated normally. Therefore, the generation of the second reset signal Rs2 is stopped. That is, the input of the second reset signal Rs2 to the monitoring circuit 38 is stopped. When the second microcomputer 32 starts to operate normally again, the control operation of the second microcomputer 32 is synchronized with the control operation of the first microcomputer 22 based on the first clock signal CK1 generated by the first microcomputer 22. Therefore, the condition that the state in which the second reset signal Rs2 is input to the monitoring circuit 38 is changed to the state in which the input of the second reset signal Rs2 is stopped indicates that the control operation of the second microcomputer 32 is appropriately synchronized with the control operation of the first microcomputer 22 based on the first clock signal CK1 of the first microcomputer 22. Thus, the monitoring circuit 38 does not generate the command signals S1 and S2, but synchronizes the control operation of the second microcomputer 32 with the control operation of the first microcomputer 22 based on the first clock signal CK1 generated by the first microcomputer 22.

Next, it is assumed that the state in which the first reset signal Rs1 and the second reset signal Rs2 are not input to the monitoring circuit 38 is changed to the state in which the control operation of the first microcomputer 22 is brought into a stopped state and then returns to an operating state. In this case, the monitoring circuit 38 generates the command signals S1 and S2. That is, when the input of the first reset signal Rs1 is stopped after the first reset signal Rs1 is input to the monitoring circuit 38, the monitoring circuit 38 generates the command signals S1 and S2. Description is given below of the reason why the command signals S1 and S2 are generated when the control operation of the first microcomputer 22 returns from the stopped state to the operating state.

<Reason why Command Signals S1 and S2 are Generated>

When the ECU 10 operates normally, the control operations of the first microcomputer 22 and the second microcomputer 32 are synchronized based on the first clock signal CK1 generated by the first microcomputer 22. The voltage values V1 and V2 of the first power supply 26 and the second power supply 36 may be changed for some reasons. Along with the change in the voltage values V1 and V2, the first reset signal generating circuit 40 may determine that the voltage value V1 of the first power supply 26 is not constantly kept within the predetermined range in which the first microcomputer 22 can be operated normally, and the second reset signal generating circuit 50 may determine that the voltage value V2 of the second power supply 36 is constantly kept within the predetermined range in which the second microcomputer 32 can be operated normally. In this case, only the first reset signal generating circuit 40 generates the first reset signal Rs1, and the second reset signal generating circuit 50 does not generate the second reset signal Rs2. That is, the control operation of the first microcomputer 22 may be brought into the stopped state.

The reason may be as follows. The first reset signal generating circuit 40 and the second reset signal generating circuit 50 have the same configuration, but have variations in their hardware or the like. That is, even if the voltage values V1 and V2 are changed but are constantly kept within the predetermined range in which the first ECU 20 and the second ECU 30 can be operated normally, only the first reset signal generating circuit 40 determines that the voltage value V1 is not constantly kept within the predetermined range in which the first ECU 20 can be operated normally, and only the first reset signal generating circuit 40 generates the first reset signal Rs1 because the thresholds L set in the first reset signal generating circuit 40 and the second reset signal generating circuit 50 have a slight variation.

In this case, the control operation of the first microcomputer 22 is stopped by the first reset signal Rs1, and the second microcomputer 32 needs to perform the control operation based on the second clock signal CK2 generated by the second microcomputer 32.

Thereafter, the first reset signal generating circuit 40 determines that the voltage value V1 is constantly kept again within the predetermined range in which the first microcomputer 22 can be operated normally. Therefore, the generation of the first reset signal Rs1 is stopped. That is, the input of the first reset signal Rs1 to the monitoring circuit 38 is stopped. When the first microcomputer 22 starts to operate normally again, the control operation of the first microcomputer 22 needs to be synchronized with the control operation of the second microcomputer 32 based on the second clock signal CK2 generated by the second microcomputer 32. This is because the control operation of the second microcomputer 32 may deviate when the first clock signal CK1 is input from the first microcomputer 22 while the second microcomputer 32 is operating normally based on the second clock signal CK2. Therefore, the condition that the state in which the first reset signal Rs1 is input to the monitoring circuit 38 is changed to the state in which the input of the first reset signal Rs1 is stopped indicates that the first microcomputer 22 needs to be synchronized based on the second clock signal CK2 of the second microcomputer 32.

That is, the monitoring circuit 38 determines that the control operation of the first microcomputer 22 returns from the stopped state to the operating state while the second microcomputer 32 is performing the control operation. Therefore, the monitoring circuit 38 generates the command signals S1 and S2 to synchronize the control operation of the first microcomputer 22 with the control operation of the second microcomputer 32 based on the second clock signal CK2 of the second microcomputer 32. Specifically, the monitoring circuit 38 generates the command signal S1 when only the first reset signal Rs1 is input to the monitoring circuit 38. When the state in which only the first reset signal Rs1 is input to the monitoring circuit 38 is changed to the state in which the input of the first reset signal Rs1 is stopped, the monitoring circuit 38 generates the command signal S2. The reason why the monitoring circuit 38 generates the command signal S1 when only the first reset signal Rs1 is input to the monitoring circuit 38 is that the second microcomputer 32 needs to perform the control operation until the first microcomputer 22 operates normally. The first clock signal CK1 is not input to the second microcomputer 32 until the first microcomputer 22 operates normally. That is, the reason is that the control operation of the second microcomputer 32 remains stopped as long as the fourth clock signal CK4 is set as the second timing signal T2 in the second microcomputer 32 until the first microcomputer 22 operates normally.

With the command signal S1, the second clock signal CK2 generated by the second synchronization signal generating circuit 33 is set as the second timing signal T2. With the command signal S2, the second clock signal CK2 generated by the second synchronization signal generating circuit 33 is output to the first synchronization signal generating circuit 23. In addition, the third clock signal CK3 generated by the first synchronization signal generating circuit 23 is output to the timer generator 24a as the first timing signal T1. Thus, the control operation of the first microcomputer 22 can be synchronized with the control operation of the second microcomputer 32 based on the second clock signal CK2 generated by the second microcomputer 32.

Based on the above-mentioned relationship between the input statuses of the first reset signal Rs1 and the second reset signal Rs2 in the monitoring circuit 38 and the command signals S1 and S2, the generation of the command signals S1 and S2 by the monitoring circuit 38 is triggered under the condition that the state in which only the first reset signal Rs1 is input to the monitoring circuit 38 is changed to the state in which the input of the first reset signal Rs1 is stopped. Under this condition, when the control operation of the first microcomputer 22 returns from the stopped state to the operating state while the second microcomputer 32 continues to perform the control operation normally, the control operation of the first microcomputer 22 can be synchronized with the control operation of the second microcomputer 32 based on the second clock signal CK2 generated by the second microcomputer 32.

Next, the operation of the ECU 10 is described. When an ignition switch mounted on a vehicle is turned on, the first power supply 26 and the second power supply 36 start to supply electric power to the first microcomputer 22 and the second microcomputer 32. At this time, the first reset signal generating circuit 40 and the second reset signal generating circuit 50 monitor the voltage values V1 and V2 of the first power supply 26 and the second power supply 36, and output the first reset signal Rs1 and the second reset signal Rs2 to the first microcomputer 22 and the second microcomputer 32 until the voltage values V1 and V2 are stabilized. Thus, the control operations are kept in a stopped state. The monitoring circuit 38 of the second microcomputer 32 monitors the first reset signal Rs1 and the second reset signal Rs2.

Due to the variations in the hardware or the like of the first reset signal generating circuit 40 and the second reset signal generating circuit 50, only the first reset signal generating circuit 40 may determine that the voltage value V1 is not constantly kept within the predetermined range in which the first ECU 20 can be operated normally. In this case, the first reset signal generating circuit 40 generates the first reset signal Rs1, and the control operation of the first ECU 20 is brought into the stopped state. Only the first reset signal Rs1 is input to the monitoring circuit 38, and therefore the monitoring circuit 38 detects that the first microcomputer 22 is in the stopped state. When the monitoring circuit 38 detects that the control operation of the first microcomputer 22 is in the stopped state, the monitoring circuit 38 outputs the command signal S1 to the switching device 33d of the second synchronization signal generating circuit 33 of the second microcomputer 32. When the command signal S1 is input to the switching device 33d, the switching device 33d switches the switch to output the second clock signal CK2 generated by the clock generator 33a to the second computation circuit 34 as the second timing signal T2.

When the first ECU 20 can be operated normally afterwards, that is, when the input of the first reset signal Rs1 to the monitoring circuit 38 is stopped afterwards, the monitoring circuit 38 outputs the command signal S2 to the clock output device 33b of the second microcomputer 32 and the switching device 23d of the first synchronization signal generating circuit 23 of the first microcomputer 22. When the command signal S2 is input to the clock output device 33b, the clock output device 33b outputs the second clock signal CK2 generated by the clock generator 33a to the clock corrector 23c of the first synchronization signal generating circuit 23. The clock corrector 23c outputs, to the switching device 23d, the third clock signal CK3 obtained by performing correction so that the first clock signal CK1 generated by the clock generator 23a coincides with the second clock signal CK2. When the command signal S2 is input to the switching device 23d, the switching device 23d switches the switch to output the third clock signal CK3 generated by the clock corrector 23c to the first computation circuit 24 as the first timing signal T1.

As described above in detail, according to this embodiment, when the state in which only the first reset signal Rs1 is input to the monitoring circuit 38 is changed to the state in which the input of the first reset signal Rs1 is stopped, the monitoring circuit 38 detects that the control operation of the first microcomputer 22 returns from the stopped state to the operating state. Therefore, when the control operation of the first microcomputer 22 returns to the operating state while only the second microcomputer 32 is operating normally, the monitoring circuit 38 can synchronize the control operation of the first microcomputer 22 with the control operation of the second microcomputer 32 based on the second clock signal CK2 generated by the second microcomputer 32. Thus, it is possible to appropriately perform the synchronization control for the first ECU 20 and the second ECU 30 when the control operation of the first ECU 20 configured to output the first clock signal CK1 serving as a reference to synchronization between the first ECU 20 and the second ECU 30 is brought into the stopped state and then returns to the operating state.

A vehicle control system according to a second embodiment is described below. Components similar to those of the first embodiment are described by assigning the same reference symbols. The second embodiment is different from the first embodiment in that an initial activation state of the ECU 10 is also taken into consideration.

It is assumed that the ECU 10 is in the initial activation state. The initial activation state refers to an initial state in which the ignition switch of the vehicle is turned on. As illustrated in FIG. 1, when the ignition switch of the vehicle is turned on, electric power starts to be supplied from the first and second power supplies 26 and 36 to the first microcomputer 22 and the second microcomputer 32. Therefore, the first reset signal Rs1 and the second reset signal Rs2 are simultaneously input from the first reset signal generating circuit 40 and the second reset signal generating circuit 50 to the monitoring circuit 38.

When the input of the first reset signal Rs1 and the input of the second reset signal Rs2 are simultaneously stopped afterwards, the monitoring circuit 38 does not generate the command signals S1 and S2. Description is given below of the reason why the monitoring circuit 38 does not generate the command signals S1 and S2 when the input of the first reset signal Rs1 and the input of the second reset signal Rs2 are simultaneously stopped.

<Reason why Command Signals S1 and S2 are not Generated>

When the electric power starts to be supplied from the first power supply 26 and the second power supply 36 to the first microcomputer 22 and the second microcomputer 32, the first reset signal generating circuit 40 and the second reset signal generating circuit 50 generate the first reset signal Rs1 and the second reset signal Rs2 until the voltage values V1 and V2 are stabilized. Therefore, the control operations of the first microcomputer 22 and the second microcomputer 32 are brought into a stopped state. When the voltage values V1 and V2 are stabilized and the first microcomputer 22 and the second microcomputer 32 are brought into an operating state, the control operation of the second microcomputer 32 is synchronized with the control operation of the first microcomputer 22 based on the first clock signal CK1 generated by the first microcomputer 22. Therefore, the condition that the first reset signal Rs1 and the second reset signal Rs2 are simultaneously input to the monitoring circuit 38 and then the input of the first reset signal Rs1 and the input of the second reset signal Rs2 are simultaneously stopped indicates that the first microcomputer 22 and the second microcomputer 32 are normally activated in the so-called initial activation state of the ECU 10. Thus, the monitoring circuit 38 does not generate the command signals S1 and S2, but synchronizes the control operation of the second microcomputer 32 with the control operation of the first microcomputer 22 based on the first clock signal CK1 generated by the first microcomputer 22.

When the state in which the first reset signal Rs1 and the second reset signal Rs2 are simultaneously input to the monitoring circuit 38 is changed to the state in which the input of the first reset signal Rs1 is stopped first and the input of the second reset signal Rs2 is stopped next, the monitoring circuit 38 does not generate the command signals S1 and S2. Description is given below of the reason why the monitoring circuit 38 does not generate the command signals S1 and S2 when the state in which the first reset signal Rs1 and the second reset signal Rs2 are simultaneously input is changed to the state in which the input of the first reset signal Rs1 is stopped first and the input of the second reset signal Rs2 is stopped next.

<Reason why Command Signals S1 and S2 are not Generated>

The condition that the input of the first reset signal Rs1 to the monitoring circuit 38 is stopped first and the input of the second reset signal Rs2 to the monitoring circuit 38 is stopped next indicates that the first microcomputer 22 starts the control operation earlier than the second microcomputer 32. Specifically, the voltage values V1 and V2 of the first microcomputer 22 and the second microcomputer 32 are gradually increased. The first reset signal generating circuit 40 may determine that the voltage value V1 is constantly kept within the predetermined range in which the first microcomputer 22 can be operated normally, and the second reset signal generating circuit 50 may determine that the voltage value V2 is not constantly kept within the predetermined range in which the second microcomputer 32 can be operated normally. In this case, the first reset signal generating circuit 40 stops generating the first reset signal Rs1 first, and the second reset signal generating circuit 50 stops generating the second reset signal Rs2 next. That is, the control operation of the second ECU 30 may be started later than the control operation of the first ECU 20.

As described in the first embodiment, this situation may occur because only the second reset signal generating circuit 50 generates the second reset signal Rs2 due to the variations in the hardware or the like of the first reset signal generating circuit 40 and the second reset signal generating circuit 50. In this case, the first microcomputer 22 performs the control operation based on the first clock signal CK1 generated by the first microcomputer 22 until the second microcomputer 32 operates normally. Then, the second reset signal generating circuit 50 then determines that the voltage value V2 is kept within the predetermined range in which the second microcomputer 32 can be operated normally. Therefore, the generation of the second reset signal Rs2 is stopped. That is, the input of the second reset signal Rs2 to the monitoring circuit 38 is stopped. When the input of the second reset signal Rs2 to the monitoring circuit 38 is stopped and the second microcomputer 32 starts to operate normally, the control operation of the second microcomputer 32 is synchronized with the control operation of the first microcomputer 22 based on the first clock signal CK1 generated by the first microcomputer 22. This is because the first clock signal CK1 serving as a reference to synchronization between the control operations of the first microcomputer 22 and the second microcomputer 32 is constantly and continuously generated even if the second microcomputer 32 starts to operate later than the first microcomputer 22.

Therefore, the condition that the input of the first reset signal Rs1 to the monitoring circuit 38 is stopped first and the input of the second reset signal Rs2 to the monitoring circuit 38 is stopped next indicates that the control operation of the second microcomputer 32 is appropriately synchronized with the control operation of the first microcomputer 22 based on the first clock signal CK1 of the first microcomputer 22 in the so-called initial activation state of the ECU 10. Thus, the monitoring circuit 38 does not generate the command signals S1 and S2, but synchronizes the control operation of the second microcomputer 32 with the control operation of the first microcomputer 22 based on the first clock signal CK1 generated by the first microcomputer 22.

When the state in which the first reset signal Rs1 and the second reset signal Rs2 are simultaneously input to the monitoring circuit 38 is changed to the state in which the input of the second reset signal Rs2 is stopped first and the input of the first reset signal Rs1 is stopped next, the monitoring circuit 38 generates the command signals S1 and S2. Description is given below of the reason why the monitoring circuit 38 generates the command signals S1 and S2 when the state in which the first reset signal Rs1 and the second reset signal Rs2 are simultaneously input to the monitoring circuit 38 is changed to the state in which the input of the second reset signal Rs2 is stopped first and the input of the first reset signal Rs1 is stopped next.

<Reason why Command Signals S1 and S2 are Generated>

The condition that the input of the second reset signal Rs2 to the monitoring circuit 38 is stopped first and the input of the first reset signal Rs1 to the monitoring circuit 38 is stopped next indicates that the second microcomputer 32 starts the control operation earlier than the first microcomputer 22. Specifically, the voltage values V1 and V2 of the first microcomputer 22 and the second microcomputer 32 are gradually increased. The second reset signal generating circuit 50 may determine that the voltage value V2 is kept within the predetermined range in which the second microcomputer 32 can be operated normally, and the first reset signal generating circuit 40 may determine that the voltage value V1 is not kept within the predetermined range in which the first microcomputer 22 can be operated normally. In this case, the second reset signal generating circuit 50 stops generating the second reset signal Rs2 first, and the first reset signal generating circuit 40 stops generating the first reset signal Rs1 next. That is, the control operation of the first ECU 20 may be started later than the control operation of the second ECU 30.

As described above, this situation may occur, for example, because the first reset signal generating circuit 40 generates the first reset signal Rs1 due to the variations in the hardware or the like of the first reset signal generating circuit 40 and the second reset signal generating circuit 50. In this case, the second microcomputer 32 needs to perform the control operation based on the second clock signal CK2 generated by the second microcomputer 32. The first reset signal generating circuit 40 then determines that the voltage value V1 is kept within the predetermined range in which the first microcomputer 22 can be operated normally. Therefore, the generation of the first reset signal Rs1 is stopped. That is, the input of the first reset signal Rs1 to the monitoring circuit 38 is stopped.

When the input of the first reset signal Rs1 to the monitoring circuit 38 is stopped and the first microcomputer 22 starts to operate normally, the first microcomputer 22 needs to be synchronized based on the second clock signal CK2 generated by the second microcomputer 32. This is because the control operation of the second microcomputer 32 may deviate when the first clock signal CK1 is input from the first microcomputer 22 while the second microcomputer 32 is operating normally based on the second clock signal CK2. Therefore, the condition that the input of the second reset signal Rs2 to the monitoring circuit 38 is stopped first and the input of the first reset signal Rs1 to the monitoring circuit 38 is stopped next indicates that the first microcomputer 22 needs to be synchronized based on the second clock signal CK2 of the second microcomputer 32 in the so-called initial activation state of the ECU 10. That is, the monitoring circuit 38 determines that the control operation of the first microcomputer 22 is changed from the stopped state to the operating state while the second microcomputer 32 is performing the control operation. Therefore, the monitoring circuit 38 generates the command signals S1 and S2 to synchronize the control operation of the first microcomputer 22 with the control operation of the second microcomputer 32 based on the second clock signal CK2 of the second microcomputer 32. Specifically, the monitoring circuit 38 generates the command signal S1 when only the first reset signal Rs1 is input to the monitoring circuit 38.

When the state in which only the first reset signal Rs1 is input to the monitoring circuit 38 is changed to the state in which the input of the first reset signal Rs1 is stopped, the monitoring circuit 38 generates the command signal S2. The reason why the monitoring circuit 38 generates the command signal S1 when only the first reset signal Rs1 is input to the monitoring circuit 38 is that the second microcomputer 32 needs to perform the control operation until the first microcomputer 22 operates normally. That is, the reason is that the control operation of the second microcomputer 32 remains stopped as long as the fourth clock signal CK4 is set as the second timing signal T2 in the second microcomputer 32 until the first microcomputer 22 operates normally.

With the command signal S1, the second clock signal CK2 generated by the second synchronization signal generating circuit 33 is set as the second timing signal T2. With the command signal S2, the second clock signal CK2 generated by the second synchronization signal generating circuit 33 is output to the first synchronization signal generating circuit 23. In addition, the third clock signal CK3 generated by the first synchronization signal generating circuit 23 is output to the timer generator 24a as the first timing signal T1. Thus, the control operation of the first microcomputer 22 can be synchronized with the control operation of the second microcomputer 32 based on the second clock signal CK2 generated by the second microcomputer 32.

According to this embodiment, it is possible to appropriately perform the synchronization control for the first ECU 20 and the second ECU 30, for example, when the ECU 10 is in the initial activation state as well as when the state in which the ECU 10 is operating normally is changed to the state in which the control operation of the first ECU 20 is brought into the stopped state and then returns to the operating state.

A vehicle control system according to a third embodiment is described below. Components similar to those of the first embodiment are described by assigning the same reference symbols.

Figure 3:
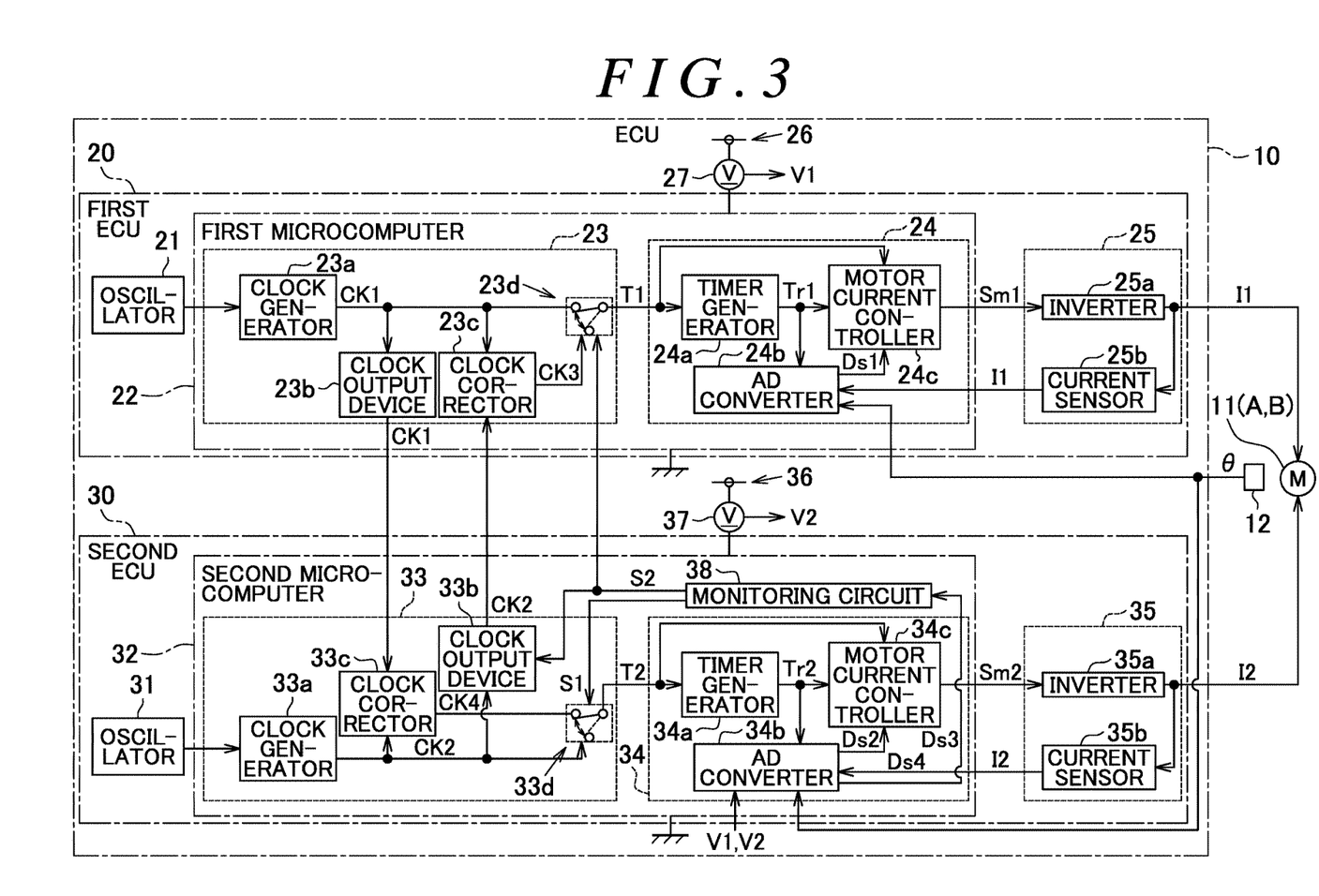
FIG. 3 is a functional block diagram illustrating a vehicle control system according to a second embodiment.

As illustrated in FIG. 3, the AD converter 34b of the second microcomputer 32 performs conversion to obtain a digital signal Ds3 from an analog signal of the voltage value V1 detected by the voltage sensor 27 provided between the first microcomputer 22 and the first power supply 26. Further, the AD converter 34b performs conversion to obtain a digital signal Ds4 from an analog signal of the voltage value V2 detected by the voltage sensor 37 provided between the second microcomputer 32 and the second power supply 36. The monitoring circuit 38 monitors the digital signals Ds3 and Ds4. The monitoring circuit 38 outputs the command signals S1 and S2 to the second synchronization signal generating circuit 33 in accordance with input statuses of the digital signals Ds3 and Ds4.

The functions of the AD converter 34b are described in more detail. When the voltage value V1 of the first power supply 26 is equal to or higher than the threshold that is a minimum value at which the first microcomputer 22 can be operated, the AD converter 34b converts the voltage value V1 into a digital signal Ds3 indicating "1". When the voltage value V1 of the first power supply 26 is lower than the threshold that is a minimum value at which the first microcomputer 22 can be operated, the AD converter 34b converts the voltage value V1 into a digital signal Ds3 indicating "0". The AD converter 34b similarly converts the voltage value V2 of the second power supply 36 into a digital signal Ds4 indicating "1" or "0". That is, when conversion is performed to obtain the digital signals Ds3 and Ds4 indicating "0", the control operations of the first microcomputer 22 and the second microcomputer 32 are brought into a stopped state, and when conversion is performed to obtain the digital signals Ds3 and Ds4 indicating "1", the control operations of the first microcomputer 22 and the second microcomputer 32 are brought into an operating state.

A relationship between the input statuses of the digital signals Ds3 and Ds4 and the command signals S1 and S2 is described. It is assumed that the ECU 10 operates normally. In this case, the digital signal Ds3 indicating "1" and the digital signal Ds4 indicating "1" are input to the monitoring circuit 38.

When the state in which the first microcomputer 22 and the second microcomputer 32 operate normally is changed to the state in which the control operation of the first microcomputer 22 is brought into the stopped state and returns to the operating state, the monitoring circuit 38 generates the command signals S1 and S2. That is, the monitoring circuit 38 generates the command signals S1 and S2 when the input of the digital signal Ds3 is changed from "1" to "0" and then from "0" to "1" again while the digital signal Ds4 indicating "1" is not changed.

The generation of the command signals S1 and S2 by the monitoring circuit 38 is triggered under the condition that the input of the digital signal Ds3 is changed from "0" to "1" while the digital signal Ds4 indicating "1" is input to the monitoring circuit 38. Under this condition, when the control operation of the first microcomputer 22 returns to the operating state while the second microcomputer 32 is operating, the control operation of the first microcomputer 22 can be synchronized with the control operation of the second microcomputer 32 based on the second clock signal CK2 generated by the second microcomputer 32.

This embodiment may be modified as follows without causing any technical contradiction. The third embodiment is described under the assumption that the ECU 10 operates normally. For example, the case where the ECU 10 is in the initial activation state may be taken into consideration.

In this case, the ignition switch of the vehicle is turned on and electric power starts to be supplied from the first power supply 26 and the second power supply 36 to the first microcomputer 22 and the second microcomputer 32. Therefore, the digital signal Ds3 indicating "0" and the digital signal Ds4 indicating "0" are simultaneously input from the AD converter 34b to the monitoring circuit 38. When the input of the digital signal Ds4 is changed from "0" to "1" first and the input of the digital signal Ds3 is changed from "0" to "1" next, the monitoring circuit 38 generates the command signals S1 and S2. In this case as well, effects similar to those of the third embodiment are attained.

The monitoring circuit 38 detects that the control operation of the first microcomputer 22 is changed from the stopped state to the operating state based on the input statuses of the first reset signal Rs1 and the second reset signal Rs2 in the first and second embodiments, or based on the input statuses of the digital signals Ds3 and Ds4 of the voltage values V1 and V2 in the third embodiment. The present invention is not limited to those cases. For example, the monitoring circuit 38 may detect that the control operation of the first microcomputer 22 is changed from the stopped state to the operating state based on the first clock signal CK1 output from the clock output device 23b of the first microcomputer 22. When the control operation of the first microcomputer 22 is in the stopped state, the first clock signal CK1 is not output from the clock output device 23b. When the control operation of the first microcomputer 22 is in the operating state, the first clock signal CK1 is output from the clock output device 23b. The monitoring circuit 38 may detect that the control operation of the first microcomputer 22 is in the stopped state when the input of the first clock signal CK1 is stopped, or may detect that the control operation of the first microcomputer 22 is in the operating state when the first clock signal CK1 is input.

In the first to third embodiments, the control target is the single motor 11 including the motor coil group A and the motor coil group B for two systems, which are electrically independent of each other. The present invention is not limited to this case. For example, the control target may be two motors each including a single motor coil group for one system having the three phases (U phase, V phase, and W phase). Further, the motor 11 may include three or more motor coil groups for systems each having the three phases (U phase, V phase, and W phase). In this case, it should be noted that the ECU 10 is provided with control circuits including microcomputers as many as the motor coil groups.

In the first to third embodiments, the ECU 10 includes the control circuits for two systems, which are the first ECU 20 and the second ECU 30. The present invention is not limited to this case. For example, the ECU 10 may include control circuits for three or more systems. In this case, at least one of the remaining control circuits except the first ECU 20 serving as the first control circuit is set so as to have the monitoring circuit 38. When it is detected that the control operation of the first ECU 20 is changed from the stopped state to the operating state, the control operation of the first ECU 20 is synchronized with the control operation of the remaining control circuits based on the clock signal serving as a synchronization signal generated by the remaining control circuits.

In the first to third embodiments, the monitoring circuit 38 is provided inside the second microcomputer 32. The present invention is not limited to this case. For example, the monitoring circuit 38 may be provided at any location inside the second ECU 30. Even when the control circuits for three or more systems are provided as described above, the monitoring circuit 38 may be provided at any location inside the control circuit instead of being provided inside the microcomputer.

What is claimed is:

1. A vehicle control system, comprising:
   a plurality of control circuits configured to cooperate together to control an operation of a control target comprising a motor, the plurality of control circuits comprising a first control circuit and second control circuit; and
   at least one monitoring circuit configured to detect operation statuses of the control circuits, wherein each of the control circuits is configured to generate a synchronization signal for synchronizing operations of the control circuits, and control operations of the control circuits are synchronized based on the synchronization signal generated by a first control circuit out of the control circuits, and when the monitoring circuit detects that the operation status of the first control circuit is changed from an off state to an operating state while the second control circuit continues to perform the control operation of the control target, the monitoring circuit is configured to synchronize the control operation of the first control circuit with the control operation of the second control circuit that is operating continuously based on the synchronization signal generated by the second control circuit that is operating continuously.

2. The vehicle control system according to claim 1, further comprising:

a plurality of power supplies connected to the respective control circuits; and a plurality of reset signal generating circuits connected to the respective control circuits, and configured to monitor voltage values of the power supplies corresponding to the control circuits to which the reset signal generating circuits are connected, and to generate reset signals for stopping the operations of the control circuits to which the power supplies are connected until the voltage values of the power supplies are stabilized, wherein the monitoring circuit is configured to monitor the reset signal generated by the reset signal generating circuit connected to the first control circuit and the reset signal generated by the reset signal generating circuit connected to the remaining control circuit, and to detect that the operation status of the first control circuit is changed from the stopped state to the operating state when a state in which only the reset signal generated by the reset signal generating circuit connected to the first control circuit is input is changed to a state in which an input of the reset signal generated by the reset signal generating circuit connected to the first control circuit is stopped.

3. A vehicle control system, comprising:

a plurality of control circuits configured to cooperate together to control an operation of a control target comprising a motor, the plurality of control circuits comprising a first control circuit and second control circuit; and at least one monitoring circuit configured to detect operation statuses of the control circuits, wherein each of the control circuits is configured to generate a synchronization signal for synchronizing operations of the control circuits, and control operations of the control circuits are synchronized based on the synchronization signal generated by a first control circuit out of the control circuits, and when the monitoring circuit detects that the operation status of the first control circuit is changed from an off state to an initial activation state or an operating state while the second control circuit continues to perform the control operation of the control target, the monitoring circuit is configured to synchronize the control operation of the first control circuit with the control operation of the second control circuit that is operating continuously based on the synchronization signal generated by the second control circuit that is operating continuously.

4. The vehicle control system according to claim 1, wherein when the monitoring circuit detects that the operation status of the second control circuit is changed from an off state to an operating state while the first control circuit continues to perform the control operation of the control target, the monitoring circuit is configured to synchronize the control operation of the second control circuit with the control operation of the first control circuit that is operating continuously based on the synchronization signal generated by the first control circuit that is operating continuously.

* * * * *